United States Patent
Wang et al.

(10) Patent No.: US 10,785,812 B2
(45) Date of Patent: Sep. 22, 2020

(54) METHOD, DEVICE AND SYSTEM FOR ESTABLISHING COMMUNICATION CONNECTION

(71) Applicant: GUANGDONG VIRTUAL REALITY TECHNOLOGY CO., LTD., Guangzhou (CN)

(72) Inventors: Guotai Wang, Guangzhou (CN); Jingwen Dai, Guangzhou (CN); Jie He, Guangzhou (CN)

(73) Assignee: GUANGDONG VIRTUAL REALITY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/536,346

(22) Filed: Aug. 9, 2019

(65) Prior Publication Data
US 2019/0364609 A1 Nov. 28, 2019

Related U.S. Application Data

(63) Continuation of application No. PCT/CN2017/096310, filed on Aug. 7, 2017.

(30) Foreign Application Priority Data

Apr. 24, 2017 (CN) .......................... 2017 1 0271885

(51) Int. Cl.
*H04W 76/10* (2018.01)
*H04B 1/713* (2011.01)

(52) U.S. Cl.
CPC ............ *H04W 76/10* (2018.02); *H04B 1/713* (2013.01)

(58) Field of Classification Search
CPC ..... H04W 84/18; H04W 84/20; H04W 40/28; H04W 48/20; H04W 76/10; H04W 76/15;
(Continued)

(56) References Cited

U.S. PATENT DOCUMENTS

2002/0075940 A1* 6/2002 Haartsen ................ H04B 1/713
375/132
2004/0082343 A1* 4/2004 Kim .................... H04M 1/7253
455/456.1
(Continued)

FOREIGN PATENT DOCUMENTS

CN 101873695 A 10/2010
CN 103631846 A 3/2014
(Continued)

OTHER PUBLICATIONS

International Search Report issued in corresponding International application No. 2017096310, dated Jan. 19, 2018(11 pages).
(Continued)

*Primary Examiner* — Khanh C Tran

(57) ABSTRACT

A method and device for communication connection are provided. The method may include: sending by a host device, a broadcast connection request to slave device according to a first timer and a broadcast frequency hopping information of the host device; the broadcast connection request being used to set the currently used frequency hopping information by a target slave device as the communication frequency hopping information; receiving by the host device, a broadcast acknowledgement response sent from the slave device, sending by the host device, a connection request to the slave device having sent the broadcast acknowledgement response, according to the first timer and the communication frequency hopping information; and establishing by the host device, a communication connection with the slave device having sent the broadcast acknowledgement response. This method can reduce the delay of establishing a communication connection between a host device and a slave device.

20 Claims, 8 Drawing Sheets

(58) Field of Classification Search
CPC ......... H04B 1/713; H04B 1/7156; H04L 1/16; H04L 2001/0093
See application file for complete search history.

(56) References Cited

U.S. PATENT DOCUMENTS

| | | | | |
|---|---|---|---|---|
| 2010/0062711 | A1* | 3/2010 | Park | H04W 8/005 455/41.2 |
| 2015/0208455 | A1* | 7/2015 | Yen | H04W 84/20 370/329 |
| 2015/0327045 | A1* | 11/2015 | Chang | H04W 8/005 370/329 |
| 2016/0337873 | A1 | 11/2016 | Zhou et al. | |
| 2017/0223579 | A1* | 8/2017 | Lee | H04W 48/14 |
| 2017/0223615 | A1* | 8/2017 | Lee | H04W 36/03 |
| 2017/0251469 | A1* | 8/2017 | Lee | H04L 1/16 |
| 2018/0152979 | A1* | 5/2018 | Lee | H04W 4/80 |
| 2019/0223156 | A1* | 7/2019 | Fujishiro | H04W 4/06 |

FOREIGN PATENT DOCUMENTS

| | | |
|---|---|---|
| CN | 103796295 A | 5/2014 |
| CN | 103812535 A | 5/2014 |
| CN | 105099924 A | 11/2015 |
| CN | 105577293 A | 5/2016 |
| CN | 106231533 A | 12/2016 |
| CN | 106488460 A | 3/2017 |
| WO | 2004038938 A1 | 5/2004 |
| WO | 2014026382 A1 | 2/2014 |

OTHER PUBLICATIONS

First Office Action issued in corresponding Chinese application No. 201710271885.2 dated Apr. 19, 2019(18 pages).

* cited by examiner

METHOD, DEVICE AND SYSTEM FOR ESTABLISHING COMMUNICATION CONNECTION

CROSS-REFERENCE TO RELATED APPLICATIONS

This application is a continuation application of International Application No. PCT/CN2017/096310, filed on Aug. 7, 2017, which claims priority to Chinese Patent Application No. 201710271885.2, filed on Apr. 24, 2017. The disclosures of the aforementioned patent applications are hereby incorporated by reference in their entireties.

TECHNICAL FIELD

The present disclosure relates to a field of wireless communication technology, and particularly to a method for communication connection, a device for communication connection, and a communication connection system.

BACKGROUND

In the virtual reality (VR) system and augmented reality (AR) system, the headset with spatial positioning input (such as HTC Vive, Oculus Rift, PlayStation VR, etc.) is based on wired transmission. In order to improve convenience, wireless transmission is currently used instead of wired transmission.

VR and AR have high low-latency requirements, in addition to the wireless transmission time, the delay may also be caused by sensor data fusion time, graphics rendering time, and pixel response time of VR screen. It can be seen that the current wireless transmission methods based on VR and AR cannot achieve the purpose of low-latency. Although the current wireless transmission protocol used by VR and AR is wireless-fidelity (Wi-Fi), Bluetooth, 4G, or the like, these technologies can realize wireless data transmission of spatial position information with low-latency, but in the actual wireless transmission process, the connection between devices takes a long time and requires complicated protocols.

SUMMARY

The present disclosure provides a method, device and system for establishing communication connection, to solve the problem that a host device and a slave device establish a communication connection needs a long time.

In a first aspect, the embodiments of the present disclosure provide a method for a communication connection. In this disclosure, the host device can broadcast based on a radio frequency chip and interact with the slave device. The method may include: in the broadcast mode, sending by the host device, a broadcast connection request to the at least one slave device according to a first timer and a broadcast frequency hopping information of the host device, wherein the broadcast connection request carrying a communication frequency hopping information, the first timer uses different frequency points within each timing duration. The broadcast connection request is used to set the currently used frequency hopping information as the communication frequency hopping information by a target slave device, the target slave device is a slave device receives the broadcast connection request according to the broadcast frequency hopping information and a second timer, a timing duration of the first timer is less than the timing duration of the second timer. Receiving by the host device, a broadcast acknowledgement response sent from the at least one slave device, sending by the host device, a connection request to the at least one slave device having sent the broadcast acknowledgement response and establishing by the host device, a communication connection with the at least one slave device having sent a broadcast acknowledgement response according to the first timer and the communication frequency hopping information.

In a second aspect, the embodiments of the present disclosure provide a method for communication connection, the method may include: receiving by the slave device, a broadcast connection request according to a broadcast frequency hopping information and a second timer, wherein the broadcast connection request is a request sent from a host device according to the broadcast frequency hopping information and a first timer, and the broadcast connection request carries the communication frequency hopping information; setting by the slave device, the currently used frequency hopping information as the communication frequency hopping information according to the broadcast connection request; sending by the slave device, the broadcast acknowledgement response to the host device; receiving by the slave device, a connection request wherein the connection request is a request sent from the host device according to the first timer and the communication frequency hopping information when the host device receives the broadcast acknowledgement response, and establishing by the slave device, a communication connection with the host device according to the connection request.

In a third aspect, the embodiments of the present disclosure provide a communication system having a function of a method for implementing the above communication connection. The functions may be implemented by hardware or by corresponding software implementation by hardware. The hardware or software includes one or more modules corresponding to the functions described above, which may be software and/or hardware.

In a possible design, the communication system may include:

the host device of the first aspect, and at least one slave device of the second aspect.

In the solution provided by the present disclosure, sending by the host device, a broadcast connection request carries the communication frequency hopping information to the at least one slave device according to the broadcast frequency hopping information and the first timer. The first timer uses the different frequency point in each timing duration, that is the frequency point is hopped according to the first timer. Since the target slave device receives the broadcast connection request according to the broadcast frequency hopping information and the second timer, the time for the slave device to successfully receive the broadcast connection request is limited in the second timer, so that the slave device can cover all the broadcast connection requests of the host device during the timing duration of the second timer, and set the currently used frequency hopping information as the communication frequency hopping information. Receiving by the host device, the broadcast acknowledgement response sent from the at least one slave device, the host device sends the connection request to at least one slave device sending a broadcast acknowledgement response and establishes the communication connection with at least one slave device sending a broadcast acknowledgement response according to the first timer and the communication hopping information. The solution provided by the present disclosure can effectively reduce the time and the complexity of establishing a communication connection.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

FIG. 5-1 is another schematic diagram of signaling interaction of a communication connection according to an embodiment of the present disclosure.

FIG. 5-2 is another schematic diagram of signaling interaction of a communication connection according to an embodiment of the present disclosure.

FIG. 5 is a flowchart of a method for sending a broadcast connection request and interaction by a host device according to an embodiment of the present disclosure.

DETAILED DESCRIPTION OF PREFERRED EMBODIMENTS

Figure 1:
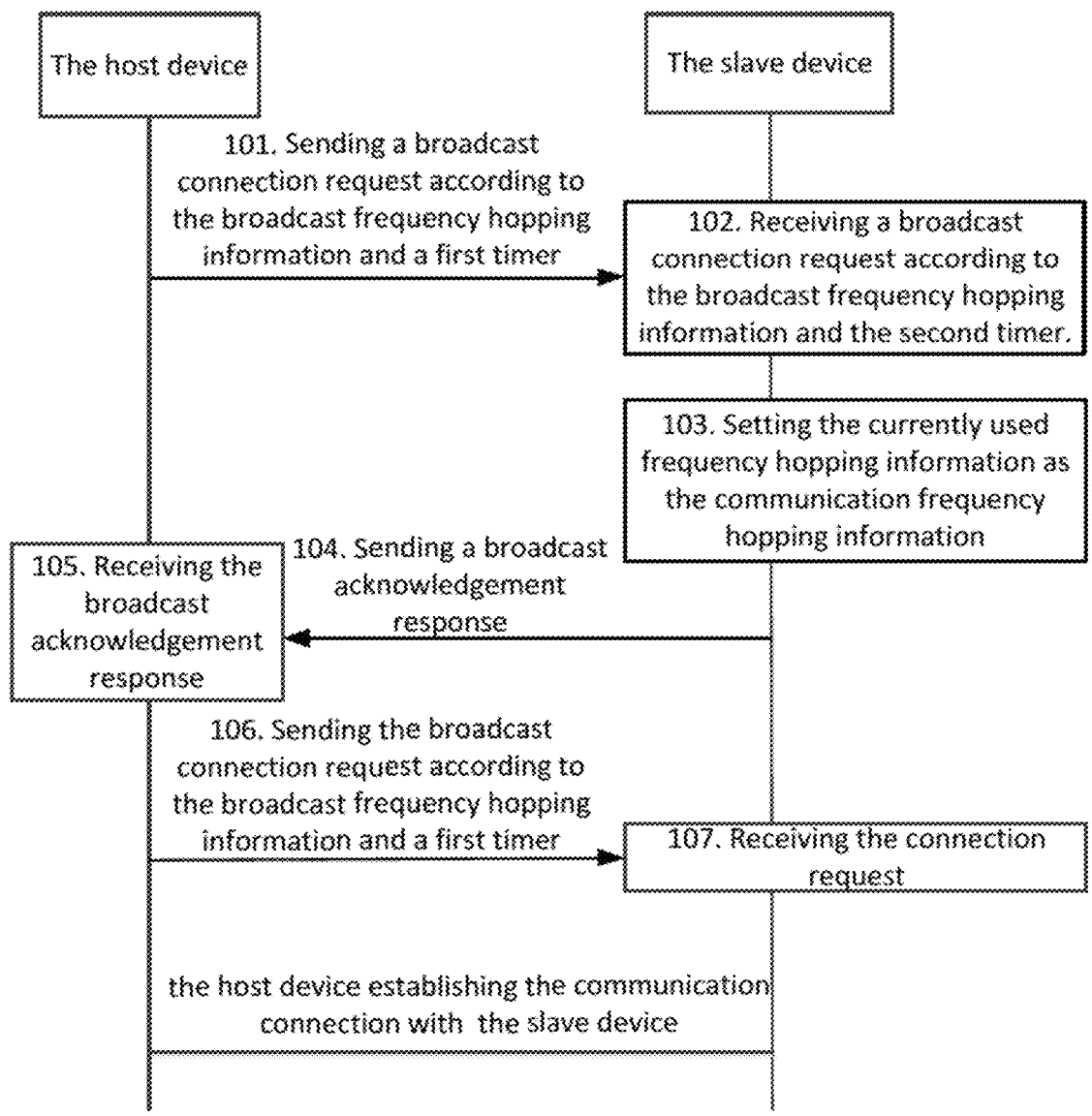
FIG. 1 is a schematic diagram of signaling interaction of a communication connection according to an embodiment of the present disclosure.

The terms "first", "second" in the specification and claims of the present disclosure and the above drawings are used to distinguish similar objects, and are not necessarily used to describe a particular order. It should be understood that the data may be interchanged where appropriate so that the embodiments described herein can be implemented in a sequence other than those illustrated or described herein. In addition, the terms "comprise" and "including" and any variants thereof, the intended to cover a non-exclusive inclusion. For example, a process, a method, a system, a product, or a device that comprises a series of steps or modules is not necessarily limited to those blocks or modules, but may include other blocks or modules not explicitly listed or inherent to such processes, methods, products or devices, the division of modules present in this disclosure is merely a logical division. In actual disclosure, there may be another way of dividing, for example, multiple modules may be combined or integrated into another system, or some features may be ignored or not executed, and otherwise displayed or discussed between each other. The coupling or direct coupling or communication connection may be through some interfaces, and the indirect coupling or communication connection between the modules may be electrical or other ways, which is not limited in the present disclosure. Moreover, the modules or sub-modules described as separate components may or may not be physically separated, may not be physical modules, or may be distributed to multiple circuit modules, and some or all of them may be selected according to actual needs to achieve the objectives of the present disclosure.

The present disclosure provide a method, device and system for establishing communication connection, and relates to the field of wireless communication technology. A host device and a slave device involved in the present disclosure may be a device that provides voice and/or data connectivity to user, the host device and the slave device can be a handheld device with wireless connectivity; or other processing device that is connected to a wireless modem. A wireless terminal can communicate with one or more core networks by a radio access network (RAN), and the wireless terminal can be a mobile terminal, such as a mobile phone (or "cellular" phone), and a computer with move function, for example, it can be a portable, pocket, handheld, computer built-in or in-vehicle mobile device that exchanges voice and/or data with the wireless access network. For example, personal communication service (PCS) telephone, cordless telephone, session initiation protocol (SIP) telephone, wireless local loop (WLL) station, personal digital assistant (PDA) and other devices. The wireless terminal may also be called a system, a subscriber unit, a subscriber station, a mobile station, a mobile, a remote station, an access point, a remote terminal, an access terminal, a user terminal, a terminal device, a user agent, a user device, or a user equipment.

In some embodiments, the slave device may be a wireless accessory, such as a handheld controller, a remote control, a three-axis gyroscope, or the like, which is not limited in the present disclosure.

To solve the above technical problems, the present disclosure mainly provides the following technical solutions.

The host device uses different 2.4 G frequency points in a broadcast mode and a connection mode, that is, frequency hopping information of the broadcast mode is different from frequency hopping information of the connection mode. A hopping period of the frequency point of the host device sends a broadcast connection request is less than a hopping period of the frequency point of the slave device monitors a broadcast connection request.

Referring to FIG. 1, the method for establishing communication connection provided by embodiments of the present disclosure will be described below.

At block 101, the host device sends a broadcast connection request to at least one slave device in the broadcast mode, according to the broadcast frequency hopping information and a first timer.

The broadcast connection request carries communication frequency hopping information, and the first timer uses different frequency points in each timing duration.

The broadcast connection request is used to set the currently used frequency hopping information to the communication frequency hopping information by a target slave device. The target slave device refers to a slave device that receives the broadcast connection request according to the broadcast frequency hopping information and a second timer, wherein the timing duration of the first timer is less than the timing duration of the second timer.

At block 102, a slave device receives the broadcast connection request according to the broadcast frequency hopping information and the second timer.

In some embodiments, in the broadcast mode, the timing duration of the first timer is a period T1 of hopping frequency point of the host device, and the timing duration of the second timer is the period T2 of hopping frequency point of the slave device, such that the host device can hop frequency points (T2/T1)−1 times within period T2.

For example, before the pre-connection state, the host device sends a broadcast data request connection at intervals of T1, wherein T1 is greater than or equal to 2 ms. The slave device hops the frequency point at intervals of T2 to monitor and receive a broadcast data, T2 can be set as T2=3*T1. The specific relationship between T2 and T1 is not limited in the present disclosure.

At block 103, the slave device sets the currently used frequency hopping information as the communication frequency hopping information, according to the broadcast connection request.

At block 104, the slave device sends a broadcast acknowledgement response to the host device.

It can be known from block 102 that there may be at least one slave device that receives the broadcast connection request sent from the host device in the same timer or in different timers, and then the slave devices that received the broadcast connection request need to send the broadcast acknowledgement response to the host device.

In some embodiments, the slave device can send the broadcast acknowledgement response in an automatic answering mode, the delay of the broadcast connection request between the host device and the slave device can be controlled within the timing duration of the first timer, and the transmission delay of the interaction data between the host device and the slave device can be controlled within the timing duration of the first timer. For example, a frequency hopping interval of the frequency point in the broadcast frequency modulation (FM) information of the host device, that is the timing duration of the first timer is 2 ms, each slave device adopts the automatic answering mode, the slave device returns a broadcast acknowledgement response to the host device within a certain time range when the broadcast connection request sent from the host device is received, for example, the broadcast response may be returned within the time range of 40-150 microseconds (us). Alternatively, the slave device returns a broadcast response to the host device within a certain time range when a data request sent from the host device is received, for example, the broadcast response may be returned within the time range of 40-150 us. It can be seen that each broadcast connection delay between the host device and the slave device can be controlled within 2 ms by the means of automatic answering when feed back to the host device. In addition, the transmission time delay of each bidirectional interaction data between the host device and the stave device can be controlled within 2 ms. In other words, it can be guaranteed that each bidirectional transmission is completed within 2 ms by automatic answering. If the bidirectional transmission cannot be completed within 2 ms, the broadcast connection can be re-established within this 2 ms, and the bidirectional transmission is sequentially performed within 2 ms of the next hopping frequency point.

At block 105, the host device receives the broadcast acknowledgement response sent from the slave device.

In some embodiments, after the host device establishes the communication connection with the slave device, the slave device acquired the broadcast frequency hopping information and the first timer currently used by the host device for broadcasting. In order to ensure the normally communication after establishing the communication connection, the slave device that receives the broadcast connection request needs to set the currently used second timer as the first timer according to the broadcast connection request, such that the frequency hopping of the slave device can be consistent with the host device. That is, after establishing the communication connection, the slave device and the host device can hop the frequency point according to the first timer.

At block 106, the host device sends a connection request to the slave device that sends the broadcast acknowledgement response according to the first timer and the communication frequency hopping information, and establishes the communication connection with the slave device.

At block 107, the slave device receives the connection request, and the slave device establishes the communication connection with the host device according to the connection request.

It should be noted that the slave device from the block 102 to the block 106 of the present disclosure refers to the slave device receives the broadcast connection request sent from the host device according to the broadcast frequency hopping information and the second timer. Whether each slave device receives the broadcast connection request sent from the host device with the same frequency point or the same timer, which is not limited in the present disclosure. For each slave device that receives the broadcast connection request sent from the host device according to the broadcast frequency hopping information and the second timer can perform the operations performed by the slave device in the present disclosure, and details are not described herein.

Compared with the existing technology, in the embodiments of the present disclosure, the host device sends a broadcast connection request carrying the communication frequency hopping information to the at least one slave device, according to the broadcast frequency hopping information and the first timer. The first timer uses the different frequency points in each timing duration, that is, the frequency point is hopped according to the first timer. Since the target slave device receives the broadcast connection request according to the broadcast frequency hopping information and the second timer, the time for the slave device successfully receives the broadcast connection request is limited to the second timer, so that the slave device can cover all the broadcast connection requests of the host device during the timing duration of the second timer, and set the currently used frequency hopping information as the communication frequency hopping information. After receiving a broadcast acknowledgement response sent from the at least one slave device, the host device sends the connection request to the at least one slave device that sends the broadcast acknowledgment response according to the first timer and the communication hopping information, and establishes the communication connection with the at least one slave device that sends the broadcast acknowledgement response. It can be seen that the method can effectively reduce the time and the complexity of establishing the communication connection In one aspect, the first timer for transmitting the broadcast connection request by the host device and the second timer for receiving the broadcast connection request by the slave device are set to be different, during receiving the broadcast connection request from the host device, the slave device and the host device have not established the communication connection, and the slave device temporarily does not known the broadcast frequency hopping information used by the host device to currently send the broadcast connection request. Therefore, in order to ensure the slave device can establish the communication connection with the host device, the slave device needs to match the frequency with the host device successfully at least once, then the broadcast data sent from the host device can be correctly received and then can interact the data with the host device according to the communication frequency hopping information carried in the broadcast data.

In the other aspect, the first timer for transmitting the broadcast connection request by the host device and the second timer for receiving the broadcast connection request by the slave device are set to be different, that can reduce the power of the slave device due to high frequency monitoring. Specifically, the slave device monitors the broadcast connection request sent from the host device in the timing duration T2 of the second timer, so that it can be guaranteed that all the frequency points for transmitting the broadcast connection request hopped by the host device in the timing duration T2 of the second timer are covered. If the slave device does not successfully match the frequency with the host device in the timing duration T2 of the second timer, the second timer is re-timed on the slave device that has not successfully matched the frequency, and the slave device continues to monitor the frequency point of the host device hopping in the timing duration T2 of the second timer until the frequency is matched successful.

Figure 2:
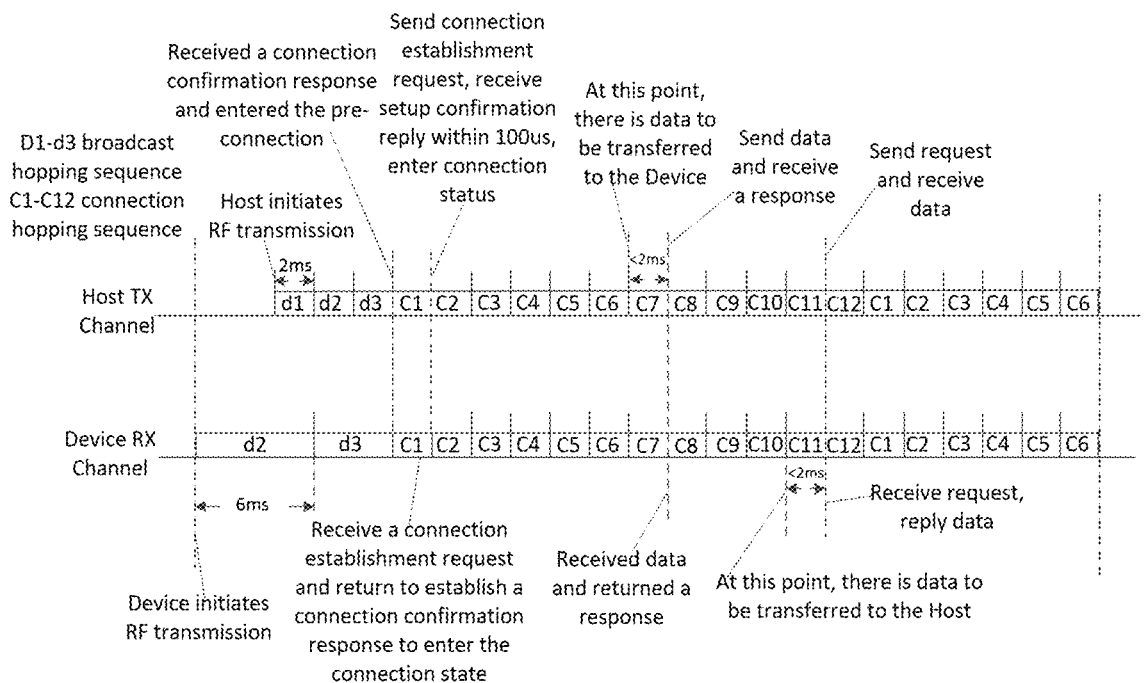
FIG. 2 is a schematic diagram of timing control of a frequency hopping sequence according to an embodiment of the present disclosure.

For example, as shown in FIG. 2, the Host TX channel line represents the frequency hopping timing control of the transmission channel of the host device (Host), and each shaded block represents a time interval. The Device Rx channel line represents the frequency hopping timing control of the receiving channel of the slave device (Device). The Host hops the frequency point every 2 ms, and the Device hops the frequency point every 6 ms during the process of matching the frequency with the Host. The Device starts to receive the radio frequency of the broadcast connection request in 6 ms time interval corresponding to d2. If the Device fails to match the frequency with the Host in d2, the Device will continue to enter into next 6 ms (for example, the d3 corresponding to a part of the next 6 ms in FIG. 2, at the end of d3, the timer is switched from 6 ms to 2 ms) for receiving the radio frequency of the broadcast connection request, and the Host initiates the radio transmission of the broadcast connection request in the d1 time interval.

Specifically, the Device enters into the d3 time interval to continue receive the radio frequency of the broadcast connection request after the end of d2. At the end of d3, the 6 ms timer of the Device is changed to the 2 ms timer (corresponding to the c1 time interval in FIG. 2), and the connection acknowledgement response is returned to the Host. At the same time, the Host receives the connection acknowledgement response returned by the Device in the d3 time interval, and then sends the connection establishment request to the Device in the c1 time interval. The Device automatically answers to the Host within 100 us when receives the connection establishment request sent from the Host in the c1 time interval. At last, the Device establishes connection with the Host in the c1 time interval, that is the Host and the Device have successfully established the communication connection to interact. The Device only hops the frequency point twice and matches the frequency will the Host completely.

In some embodiments of the present disclosure, after the host device establishes the communication connection with the slave device that sends a broadcast acknowledgement response, the host device and the slave device may farther use the communication frequency hopping information and the first timer to interact.

In some embodiments of the present disclosure, considering the time for establishing the communication connection between each slave device and the host device is different within the radiation range of the host device, the following situation may exist:

A. a part of the slave devices may have established the communication connection with the host device;
B. a part of the slave devices may be establishing the communication connection with the host device;
C. a part of the slave devices may still have not received the broadcast connection request sent from the host device.

The broadcast connection between the host device and the unconnected slave device may interfere with the interaction between the host device and the connected slave device, the interaction between the host device and the connected slave device may interfere with the broadcast connection between the host device and the unconnected slave device. To reduce such interference, the following settings can also be used for the host device and the slave device.

For the host device, the first frequency paint used by the host device to send the broadcast connection request is different from the second frequency point, wherein the second frequency point is a frequency point used by the host device to interact with the slave device, which can be achieved by setting broadcast frequency information and communication frequency information. It can be seen that, the frequency point used by the host device to broadcast is different from the frequency point used by the host device to interact with the slave device, such that it can avoid that the data transmission of the slave device that has established the communication connection with the host device which will affect the unconnected slave device cannot establish the communication with the host device for a long time, or lengthen the time of establish a communication connection. In one aspect, the present disclosure can ensure that each slave device establishes the communication connection with the host device quickly by setting the first frequency point to be different from the second frequency point.

In another aspect, a plurality of communication systems can be existed in the same space environment, for example, a communication system for a host device interacts with a slave device, and a communication system for a host device and a slave device perform a broadcast connection can exist at the same time.

For the slave device, the third frequency point used by the slave device to receive the broadcast connection request is different from the fourth frequency point, wherein the fourth frequency point is a frequency point used by the slave device to interact with the host device. It can be ensured that the slave device which is interacting with the host device does not interfere with another slave device which is marching the frequency with the host device, thereby the coexistence of multiple communication systems can be implemented.

In some embodiments of the present disclosure, the number of frequency points included in the communication frequency hopping information is greater than the number of frequency points included in the broadcast frequency hopping information.

In some embodiments of the present disclosure, a timeout mechanism can be used. Even if the host device does not receive the broadcast acknowledgement response or the data request response fed back from the slave device, the host device will continue sending the broadcast connection request next time in the first timer. Wherein, the timeout mechanism refers to the receive response timeout of receiver, such as the slave device that receives the broadcast connection request or a data request, or a host device that receives a data request, or a host device that receives an interactive data sent from the slave device. In addition, the first timer in the present disclosure restarts the timing every time after the end of the timing, and the timing duration can be fixed or dynamically changed, which is not limited in the present disclosure.

In addition, during the timing of the first timer, when a timer interrupt is triggered, the timer is restarted immediately. Therefore, it can be ensured that the host device synchronizes with the slave device by frequency hopping within the timing duration of the at least one first timer, that is, the frequency is matched by the timing of the first timer. Moreover, the host device and the slave device can interact at the same frequency point at the same time when the frequency is matched.

In some embodiments of the present disclosure, the slave device can use a timeout mechanism, specifically, when the slave device establishes a communication connection with the host device according to the connection request, the slave device may use the second timer and the broadcast frequency hopping information to monitor the broadcast connection request sent from the host device, if the slave device does not receive the connection request sent from the host device within a preset duration.

In some embodiments, after the slave device sends the broadcast acknowledgement response to the host device, the slave device may use the second timer and the broadcast frequency hopping information to monitor the broadcast connection request sent from the host device if the slave device does not receive the connection request sent from the host device within a preset duration.

Figure 3:
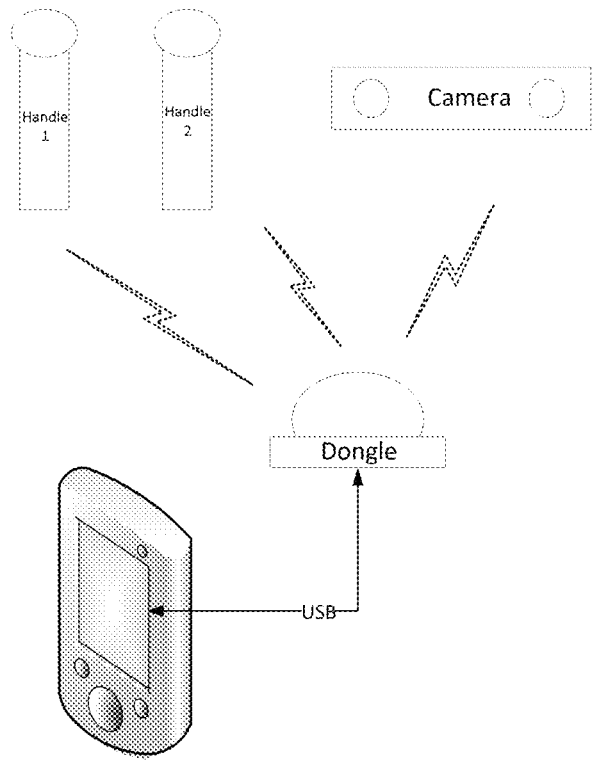
FIG. 3 is a schematic diagram of a network topology structure of a communication connection according to an embodiment of the present disclosure.

For ease of understanding, the following describes a method for communication connection in a specific scene. The communication system may be composed of a host device and a plurality of the slave devices. The host device and the slave device interact with each other based on 2.4 G radio frequency chip. The following takes the host device as a dangle, and takes the slave devices as a plurality of handheld controllers and takes a camera as an example. Referring to FIG. 3, the dongle is a host device, the handheld controller 1, handheld controller 2, and camera are the slave devices. Wherein, the dongle can be an electronic dog or a receiver, which can output the data to mobile phone or PC via the data line (USB), and the camera is used for capturing images, which can optically locate the handheld controller 1, the handheld controller 2 and the dongle. The handheld controller 1 and the handheld controller 2 can be used to calculate the gesture angle of the user, wherein the gesture angle includes a yaw angle, a pitch angle, and a roll angle. The transmission mode between the dongle and the handheld controller 1, the dongle and the handheld controller 2, the dongle and the camera are mainly divided into a broadcast mode and a connection mode, wherein the broadcast mode and the connection mode use different 2.4 G frequency points, the radio frequency modulation rate can be 2 Mbps, and the broadcast mode and the connection mode use different frequency hopping sequences. For example, the broadcast mode can use three frequency points as the frequency hopping sequence, the connection mode uses twelve frequency points as the frequency hopping sequence.

In the broadcast mode, the host device and the slave device do not establish a connection, and only send and receive the broadcast data. When the host device is broadcasting, the host device starts a 2 ms timer and hops the frequency point every 2 ms, the slave device starts the 6 ms timer and hops the frequency point every 6 ms. Thus, the host device can hop the frequency point twice within 6 ms, and the slave device can monitor three frequency points of the host device within 6 ms.

Figure 4:
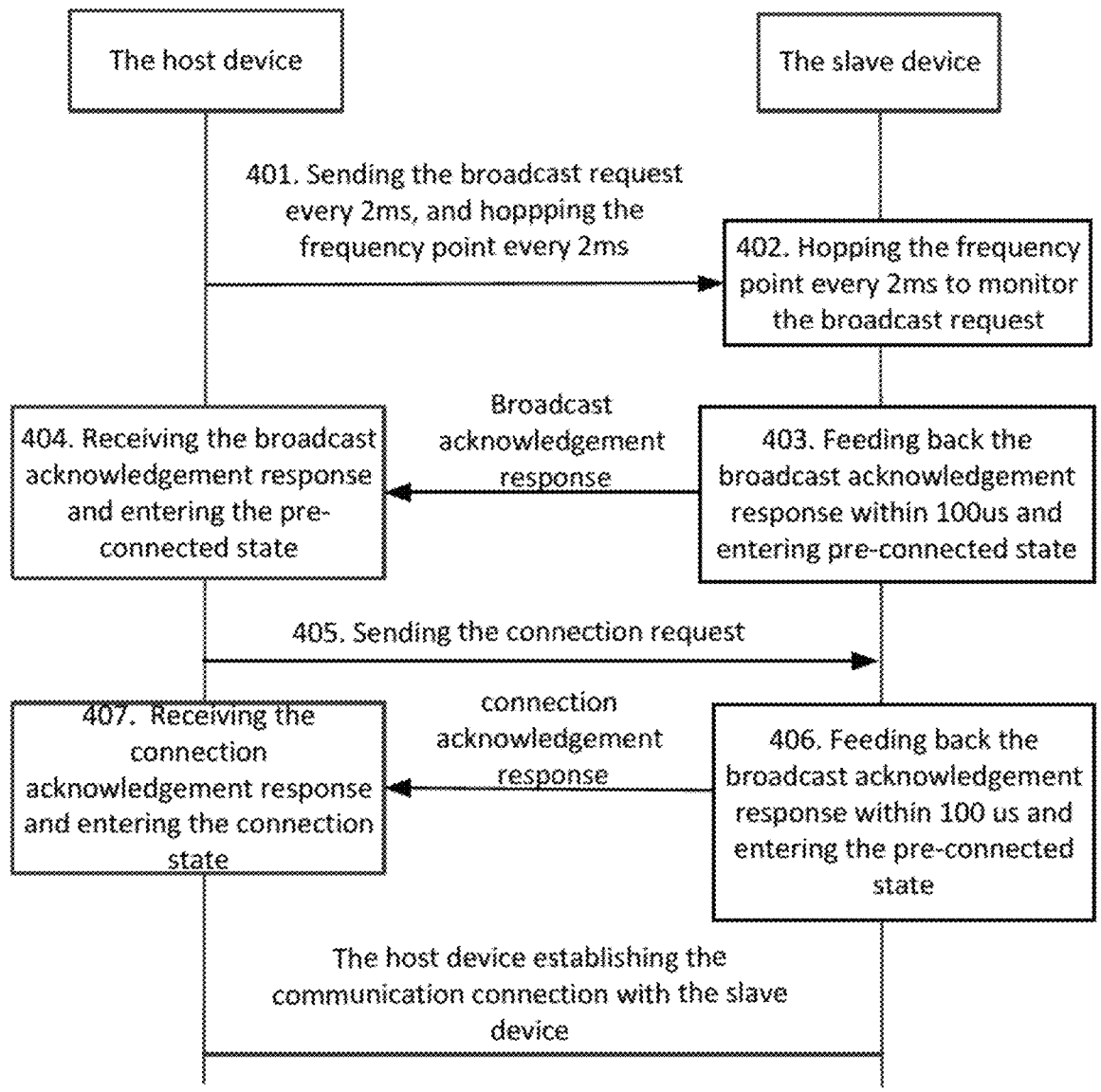
FIG. 4 is a schematic diagram of another signaling interaction of a communication connection according to an embodiment of the present disclosure.

The following describes the broadcast connection establishment process, and data transmission and reception process between the host device and the slave device shown in FIG. 4.

At block 401, the host device sends a broadcast data to the slave device every 2 ms, and hops the frequency point in the frequency hopping sequence every 2 ms.

At block 102, the slave device hops the frequency point every 6 ms to monitor and receive the broadcast data.

At block 403, the slave device feeds back a broadcast acknowledgement response to the host device within 100 us when receiving the broadcast data, and enters into a pre-connected state.

At block 404, the host device receives the broadcast acknowledgement response and enters into the pre-connection state, and then sends a connection request to the slave device.

At block 406, the slave device receives the connection request, the slave device feeds back the connection acknowledgement response to the host device within 100 us, and then enters into the connection state.

At block 407, the host device receives the connection acknowledgement response, and enters into a connection state, and then establishes a communication connection with the slave device.

Since the slave device does not hop the frequency point to monitor the broadcast connection request of the host device within 6 ms, such that the slave device can cover all the broadcast frequency points that the host device hops within 6 ms, even if the slave device does not complete matching the frequency with the host device within the first 2 ms, the slave device will continue to monitor the frequency point with next 2 ms in 6 ms, such that the slave device can hop the frequency point with several times (twice in FIG. 4), that is the slave device can match the frequency with the host device.

Figures 1, 5:
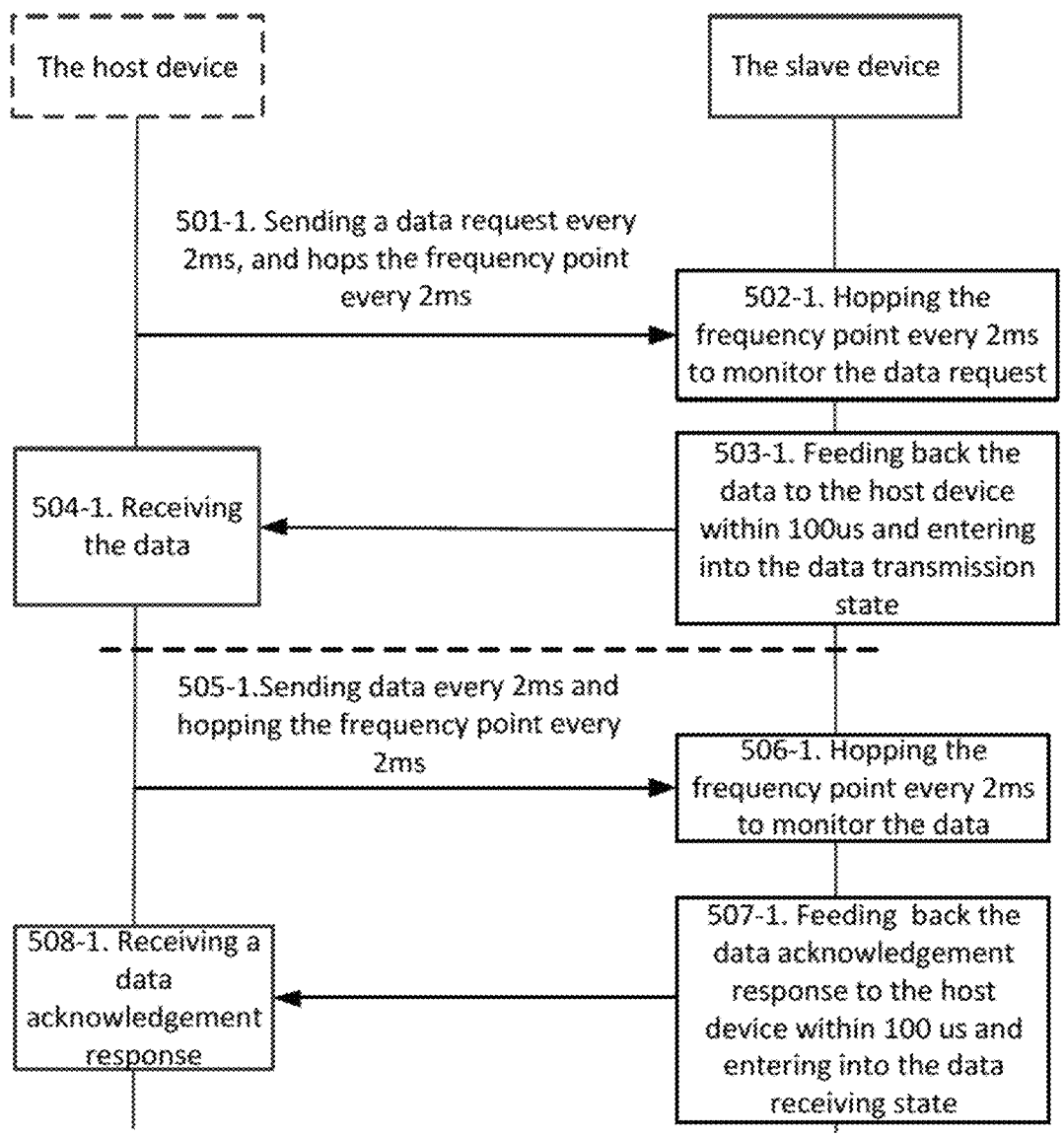
Figures 2, 5:
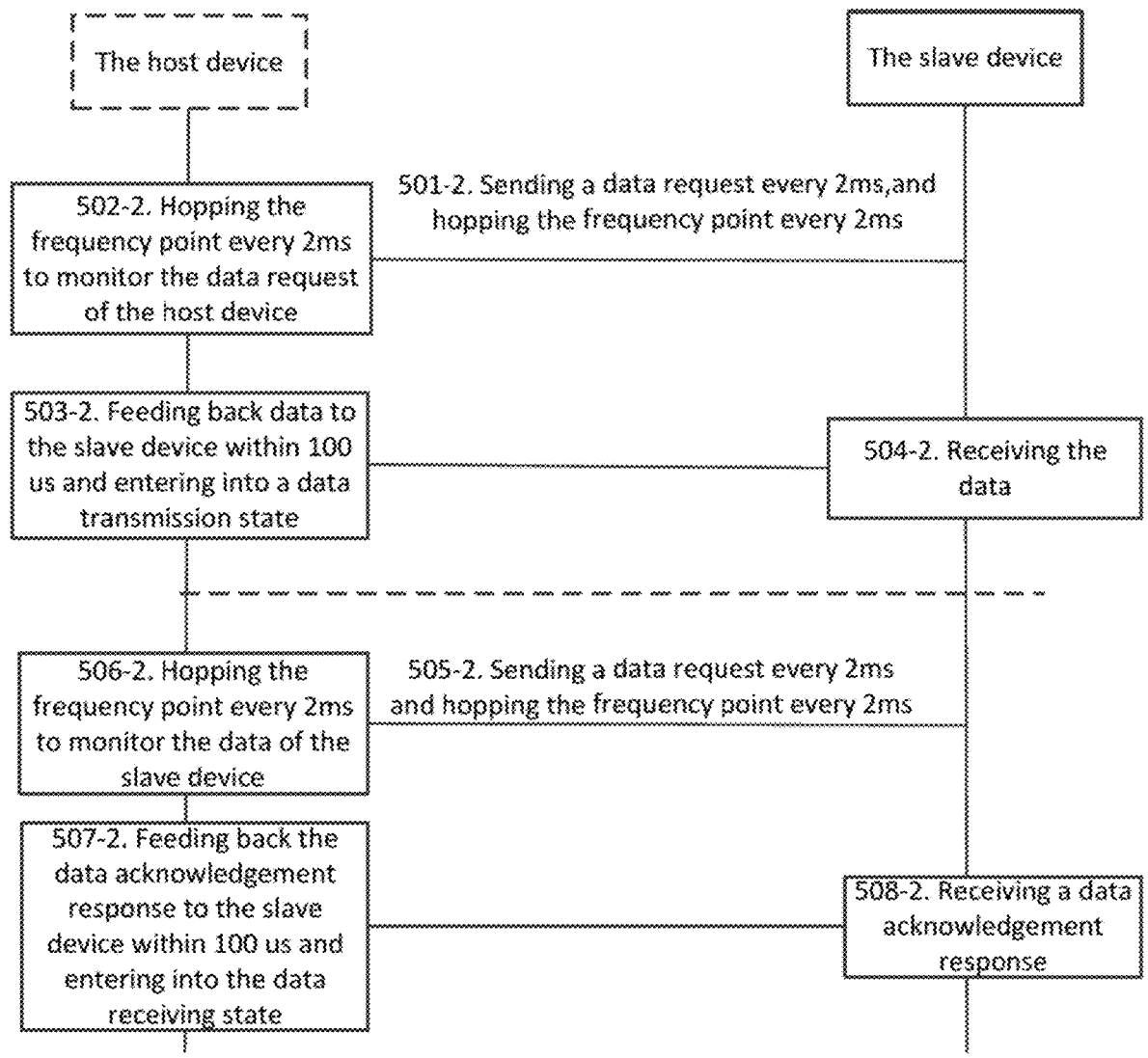
Figure 5:
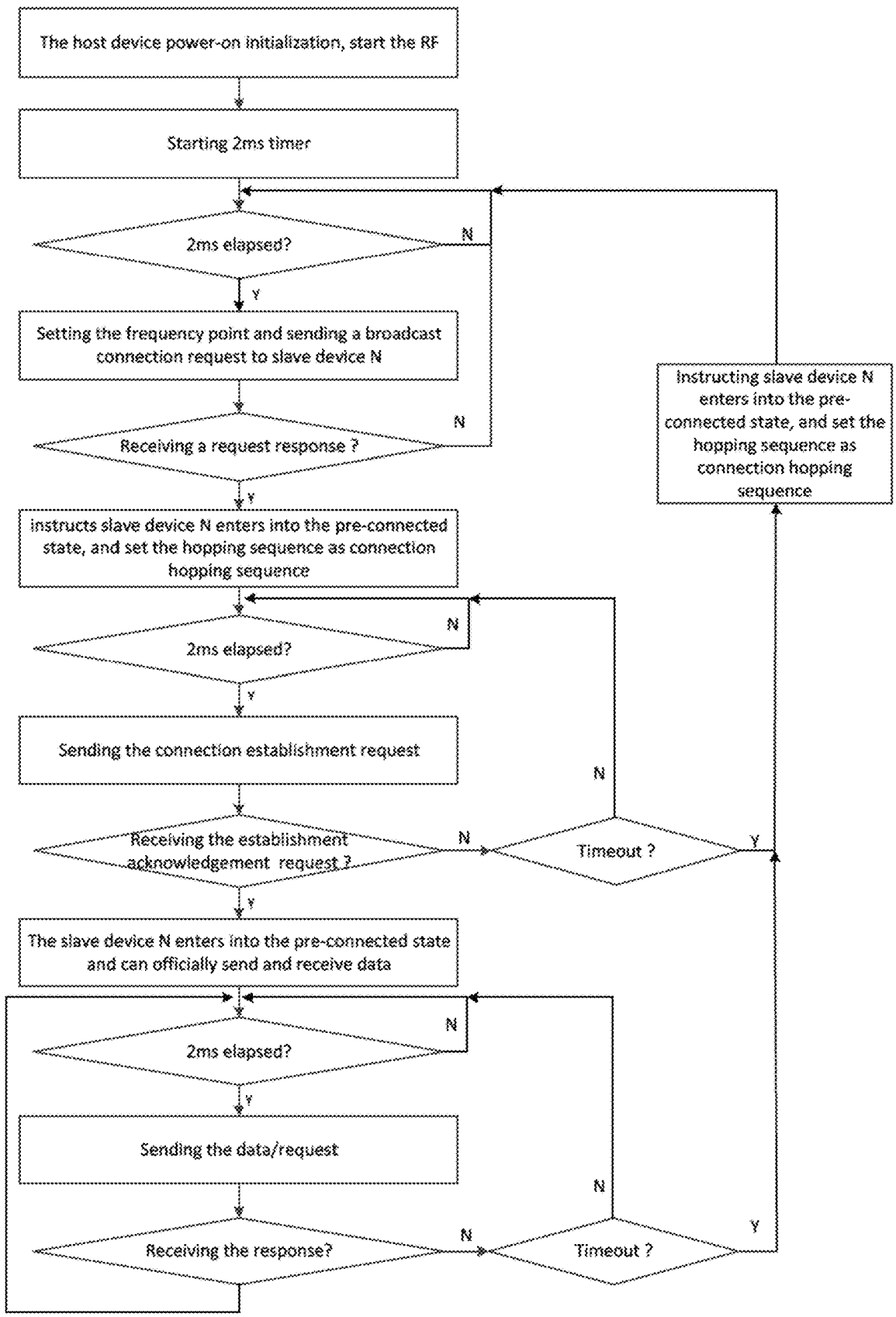

In the connection mode, the host device and the slave device still interact with each other based on a 2 ms timer:

FIG. 5-1 shows the process of the host device requests data from the slave device, and the process may include following blocks.

At block 501-1, the host device sends a data request every 2 ms, and hops the frequency point every 2 ms.

At block 502-1, the slave device hops the frequency point every 2 ms to monitor the data request of the host device.

At block 503-1, the slave device feeds back the data to the host device within 100 us and enters into a data transmission state when the slave device monitors the data request of the host device.

At block 504-1, the host device receives data led back from the slave device.

The process of the host device sends data to the slave device may include following blocks.

At block 505-1, the host device sends data every 2 ms, and hops the frequency point every 2 ms.

At block 506-1, the slave device hops the frequency point every 2 ms to monitor the data of the host device.

At block 507-1, the slave device feeds back the data acknowledgement response to the host device within 100 us, and enters into a data receiving state when receiving the data of the host device.

At block 508-1, the host device receives a data acknowledgement response fed back from the slave device.

Correspondingly, the process of the host device requests data from the slave device may include following blocks, as shown in FIG. 5-2.

At block 501-2, the slave device sends a data request every 2 ms, and hops the frequency point every 2 ms.

At block 502-2, the host device hops the frequency point every 2 ms to monitor the data request of the slave device.

At block 503-2, the host device feeds back data to the slave device within 100 us and enters into the data transmission state after monitoring the data request of the slave device.

At block 504-2, the slave device receives data fed back from the host device.

The process of the slave device sends data to the host device may include following blocks.

At block 505-2, the slave device sends data every 2 ms, and hops the frequency point every 2 ms.

At block 506-2, the host device hops the frequency point every 2 ms to monitor the data of the slave device.

At block 507-2, the host device feeds back the data acknowledgement response to the slave device within 100 us, and enters into the data receiving state after receiving the data of the slave device.

At block 508-2, the slave device receives a data acknowledgement response fed back from the host device.

The following describes the data transmission and reception, timer setting of the host device and the slave device in the broadcast mode and the connection mode respectively. For the host device, as shown in FIG. 5, after the host device is powered on the RF transceiver is started, and the 2 ms timer for sending the broadcast connection request is started. When the 2 ms timing ends, the host device hops the frequency point (uses a new frequency point) to send a broadcast connection request. The host device instructs the slave device that fed back the request response to enters into the pre-connected state, and configures the currently used broadcast frequency hopping sequence to the connection frequency hopping sequence when receiving a request response fed back from the slave device. When the host device does not receive the request response, the 2 ms timer can be restarted. The host device sends a connection establishment request to the slave device that in the pre-connected state when the 2 ms timing expires. When the host device receives the connection acknowledgement response fed back from the slave device, the host device instructs the slave device that fed back the connection acknowledgement response to enters into the connection state, and the host device can interact with the slave device.

If the host device does not receive the connection acknowledgement response from the slave device, the host device determines whether it is times out. If it does not time out, the host device restarts the 2 ms timer, if it times out, the host device instructs the slave device that has not fed back the connection acknowledgement response within 2 ms to enters into the broadcast state.

In the process of interaction, both the host device and the slave device start the 2 ms timer. The host device sends data/request to the slave device after the 2 ms inner starts. If the host device received the response fed back from the slave device, the 2 ms timer is restarted to enter into the next round of interaction, wherein the response includes data acknowledgement response or data. If the host device dose not receive the response fed back from the slave device, the host device determines whether it times out, wherein the response includes data acknowledgement response or data. If it does not time out, the host device restarts the 2 ms timer and enter into the next round of interaction. If it times out, the host device instructs the slave device that does not feed back the connection acknowledgement response within 2 ms to enter into the broadcast state.

If the host device does not receive the connection acknowledgement response fed back from the slave device, the host device determines whether it times out. If it does not time out, the host device restarts the 2 ms timer. If it times out, the host device instructs the slave device that does not feed back the connection acknowledgement response within 2 ms to enter into the broadcast state.

Figure 6:
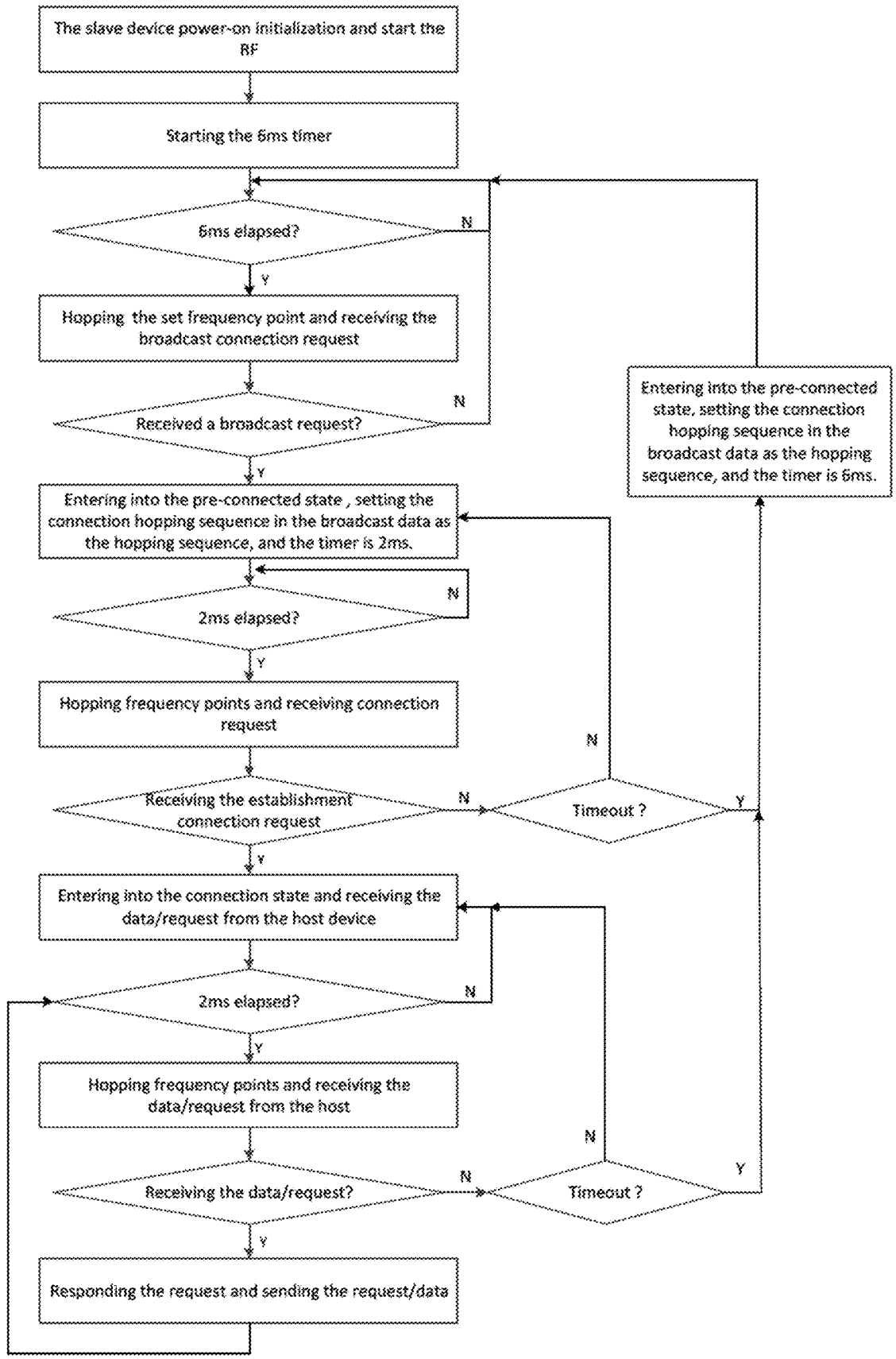
FIG. 6 is a flowchart of sending a broadcast connection request and interaction from a device according to an embodiment of the present disclosure.

For the slave device, as shown in FIG. 6, after the slave device is powered on, the slave device starts the RF transceiver and starts the 6 ms timer to monitor the broadcast connection request. When the 6 ms timing ends, the slave device hops the frequency point (uses a new frequency point) and continues to monitor the broadcast connection request. After receiving the broadcast connection request sent from the host device, the slave device enters into the pre-connected state and set the currently used broadcast frequency hopping sequence as the connected frequency hopping sequence and set the current 6 ms timer as the 2 ms timer. If the slave device does not receive the broadcast connection request sent from the host device, the slave device restarts the 6 ms timer, and continues to monitor the broadcast connection request sent from the host device.

The slave device starts the process of monitoring the connection establishment request sent from the host device: the slave device starts the 2 ms timer, and hops the frequency point of monitoring the connection establishment request when the 2 ms timing time expires. The slave device enters into the connection state, and then the slave device can interact with the host device after receiving the connection establishment request.

If the slave device does not receive the connection establishment request, the slave device determines whether it times out. If it does not time out, the slave device restarts the 2 ms timer and continues to monitor the connection establishment request sent from the host device. If it times out, the slave device enters into the broadcast state and set the frequency hopping sequence as the broadcast frequency hopping sequence and set the 6 ms timer as the 2 ms timer.

If the slave device receives the data/request sent from the host device within 2 ms, the slave device sends a response/data to the host device in response to the received request. The slave device restarts the 2 ms timer continuously monitor the data/request sent from the host device and enter into the next round of interaction when the 2 ms timer expires.

In the process of the interaction, both the host device and the slave device start the 2 ms timer. If the slave device does not receive the data/request sent from the host device, the slave device determines whether it times out. If it does not time out, the slave device restarts the 2 ms timer and enters into the next round of interaction. If it times out, the slave device enters into the broadcast state, and sets the frequency hopping sequence as the broadcast hopping sequence, and sets the 2 ms timer as the 6 ms timer.

As can be seen from the embodiments corresponding to FIG. 5 and FIG. 6, the present disclosure does not require a complicated connection protocol and does not require complicated operation steps compared to the conventional connection establishment process based on the Wi-Fi. Compared with the existing technology, the present disclosure effectively simplifies connection steps and shortens the length of connection establishment.

The features of the first timer, the second timer, the broadcast frequency modulation information, the communication frequency modulation information, the pre-connection state, the connection state in any of the foregoing embodiments described in FIG. 1 to FIG. 6 are also applicable to FIG. 4 and FIG. 5 in the present disclosure and if will not be described again it the subsequent similarities.

The above describes a method for communication connection in the present disclosure. The following describes the host device, the slave device, and the communication system for performing the above-described method for communication connection.

Figure 7:
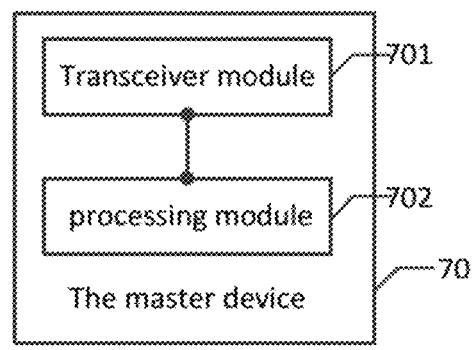
FIG. 7 is a schematic block of a host device according to an embodiment of the present disclosure.

Referring to FIG. 7, the host device 70 includes a transceiver module 701 and a processing module 702. The processing module 702 is configured to control the transceiver operation of the transceiver module 701.

The transceiver module 701 is configured to send a broadcast connection request to the at least one slave device according to the broadcast frequency hopping information of the host device, wherein the broadcast connection request carrying the communication frequency hopping information, the first timer uses different frequency points within each timing duration.

The broadcast connection request is configured to the target slave device set the currently used frequency hopping information as the communication frequency hopping information, the target slave device refers to the slave device that receives the broadcast connection request according to the broadcast frequency hopping information and the second timer, the timing duration of the first timer is less than the timing duration of the second timer.

The processing module 702 is configured to after receiving the broadcast acknowledgement response sent from the at least one slave device, the processing module 702 sends the connection request to the at least one slave device that send a broadcast acknowledgement response and establishes the communication connection with the at least one slave device that send the broadcast acknowledgement response by the transceiver module 701 according to the first timer and the communication hopping information.

In some embodiments of the disclosure, the broadcast connection request is further used by the slave device to set a second timer currently used as the first timer.

In some embodiments of the disclosure, after the processing module 702 establishes the communication connection with the at least one slave device that sends the broadcast acknowledgement response, the processing module 702 is further configured to:

use the communication frequency hopping information and the first timer to interact with the successfully connected slave device by the transceiver module 702.

In some embodiments of the present disclosure, the first frequency point used by the host device to send a broadcast connection request is different from the second frequency point, the second frequency point is the frequency point used by the host device and the slave device to interact with each other.

In some embodiments of the present disclosure, in the broadcast mode, the timing duration of the first timer is the period T1 of hopping frequency point of the host device, and the timing duration of the second timer is the period T2 of hopping frequency point of the slave device. The host device can hop frequency point T2/T1 times during the period T2.

In some embodiments of the disclosure, the number of frequency points included in the communication frequency hopping information is greater than the number of frequency points included in the broadcast frequency hopping information.

Figure 8:
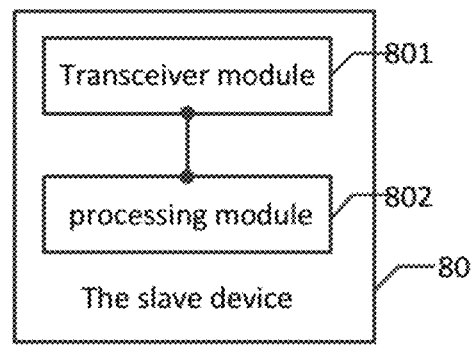
FIG. 8 is a schematic block of a slave device according to an embodiment of the present disclosure.

Referring to FIG. 8, the slave device 80 includes a transceiver module 801 and a processing module 802. The processing module 802 is configured to control the transceiver operation of the transceiver module 801.

The transceiver module 801 is configured to receive the broadcast connection request according to the broadcast frequency hopping information and the second timer, the broadcast connection request is the request sent from the host device according to the broadcast frequency hopping information and the first timer, and the broadcast connection request carries the communication frequency hopping information, the timing duration of the first timer is less than the timing duration of the second timer.

The processing module 802 is configured to set the currently used frequency hopping information as the communication frequency hopping information according to the broadcast connection request.

The transceiver module 801 is configured to send the broadcast acknowledgement response to the host device.

The transceiver module 801 receives the connection request sent from the host device according to the first timer and the communication frequency hopping information after receiving the broadcast acknowledgement response, and establish a communication connection with the host device according to the connection request.

In some embodiments of the disclosure, after the transceiver module 802 receives the broadcast connection request according to the broadcast hopping information and the second timer, the processing module 802 is further configured to:

set the second timer currently used as the first timer according to the broadcast connection request.

In some embodiments of the disclosure, after establishing the communication connection with the host device according to the connection request, the processing module 802 is further configured to:

use the communication frequency hopping information and the first timer to interacts with the host device by the transceiver module 801.

In some embodiments of the present disclosure, the third frequency point used by the slave device to receive the broadcast connection request is different from the fourth frequency point, and the fourth frequency point is the frequency point used by the slave device and the host device for the current interaction.

In some embodiments of the disclosure, after establishing a communication connection with the host device according to the connection request, the transceiver module 801 is further configured to:

when the slave device does not receive the connection request sent from the host device within the preset duration, the second timer and the broadcast frequency hopping information are used to monitor the broadcast connection request sent from the host device.

In some embodiments of the disclosure, after the slave device sends the broadcast acknowledgement response to the host device, the transceiver module 801 is further configured to:

when the slave device does not receive the connection request sent from the host device within the preset duration, the second timer and the broadcast frequency hopping information are used to monitor the broadcast connection request sent from the host device.

Figure 9:
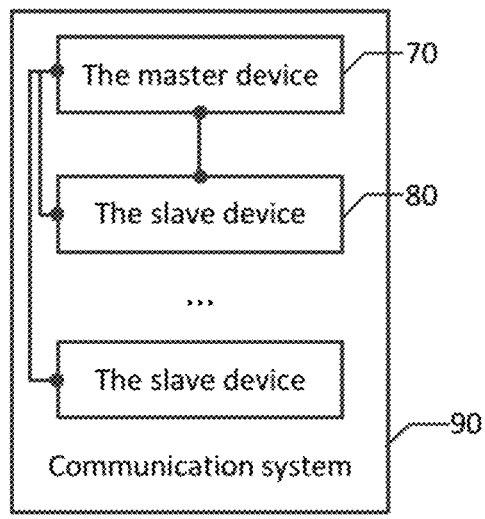
FIG. 9 is a schematic block of a communication system according to an embodiment of the present disclosure.

Referring to FIG. 9, the communication system 90 includes the host device shown in FIG. 7 and the slave device shown in FIG. 8.

In the above embodiments, the descriptions of the various embodiments each has its own emphasis, and the parts that are not detailed in a certain embodiment can be referred to the related descriptions of other embodiments.

A person skilled in the art can clearly understand that, for the convenience and brevity of the description, the specific working process of the system, the device and the module described above can refer to the corresponding process in the foregoing method embodiments, and details are not described herein again.

In the embodiments provided by the present disclosure, it should be understood that the disclosed system, apparatus, and method may be implemented in other manners. For example, the device embodiments described above are merely for schematic description. For example, the division of the modules is only based on a logical function. In actual implementation, there may be another division manner, for example, multiple modules or components may be combined or can be integrated into another system, or some features can be ignored or not executed. In addition, the mutual coupling or direct coupling or communication connection shown or discussed may be an indirect coupling or communication connection through some interface, device or module, and may be in an electrical, mechanical or other form.

The modules described as separate components may or may not be physically separated. The components displayed as modules may or may not be physical modules, that is, may be located in one place, or may be distributed to multiple network modules. Some or all of the modules may be selected according to actual needs to achieve the purpose of the solution of the embodiment.

In addition, each functional module in each embodiment of the present disclosure may be integrated into one processing module, or each module may exist physically separately, or two or more modules may be integrated into one module. The above integrated modules can be implemented in the form of hardware or in the form of software functional modules. The integrated modules, if implemented in the form of software functional modules and sold or used as separate products, may be stored in a computer readable storage medium.

In the above embodiments, it may be implemented in whole or in part by software, hardware, firmware, or any combination thereof. When implemented in software, it may be implemented in whole or in part in the form of a computer program product.

The computer program product includes one or more computer instructions. When the computer program instructions are loaded and executed on a computer, the processes or functions described in accordance with embodiments of the present disclosure are generated in whole or in part. The computer can be a general-purpose computer, a special purpose computer, a computer network, or other programmable device. The computer instructions can be stored in a computer readable storage medium or transferred from one computer readable storage medium to another computer readable storage medium, for example, the computer instructions can be from a website site, computer, server or data center transfer to another website site, computer, server, or data center by wire (coaxial cable, fiber optic, digital subscriber line (DSL), or wireless (infrared, wireless, microwave, etc.). The computer readable storage medium can be any available media that can be stored by a computer or a data storage device such as a server, data center, or other data storage device. The usable medium may be a magnetic medium (a floppy disk, a hard disk, a magnetic tape), an optical medium (a DVD), or a semiconductor medium (such as a solid-state disk (SSD)).

The technical solutions provided by the present disclosure are described in detail above. The specific examples are used in the present disclosure to explain the principles and implementation manners of the present disclosure. The description of the above embodiments is only used to help understand the method and core ideas of the present disclosure. At the same time, for the people skilled in the art, in view of the idea of the present disclosure, are subject to change in the specific embodiments and the scope of disclosure, and the contents of the present specification should not be construed as limiting the present disclosure.

What is claimed is:

1. A method for communication connection, comprising:
   sending, by a host device, a broadcast connection request to at least one slave device according to a first timer and a broadcast frequency hopping information of the host device, wherein the broadcast connection request carries a communication frequency hopping information, and the first timer uses different frequency points within each timing duration; wherein the broadcast connection request being used to set the currently used frequency hopping information as the communication frequency hopping information by a target slave device, the target slave device is a slave device receives the broadcast connection request according to the broadcast frequency hopping information and a second timer, and a timing duration of the first timer is less than the timing duration of the second timer;
   receiving, by the host device, a broadcast acknowledgement response sent from the at least one slave device;
   sending, by the host device, a connection request to the at least one slave device having sent the broadcast acknowledgement response, according to the first timer and the communication frequency hopping information; and
   establishing, by the host device, a communication connection with the at least one slave device having sent the broadcast acknowledgement response.

2. The method of claim 1, wherein the broadcast connection request is further configured to instruct the target slave device to set a second timer currently used as the first timer.

3. The method of claim 2, wherein after establishing a communication connection with the at least one slave device, the method comprises:
   using, by the host device, the communication frequency hopping information and the first timer to interact with the connected slave device.

4. The method of claim 1, wherein a first frequency point used by the host device to send the broadcast connection request is different from a second frequency point, the second frequency point is a frequency point used by the host device and the slave device to interact with each other.

5. The method of claim 4, wherein in the broadcast mode, the timing duration of the first timer is a period T1 of a hopping frequency of the host device, the timing duration of the second timer is a period T2 of the hopping frequency of the slave device, and the host device hops frequency point T2/T1 times during the period T2.

6. The method of claim 1, wherein the timing duration of the second timer is an integer multiple of the timing duration of the first timer.

7. The method of claim 1, wherein during the timing of the first timer, restarting the first timer when a timer interrupt is triggered.

8. The method of claim 1, when the host device does not receive the broadcast acknowledgement response fed back from the slave device, the host device enters into the next process of sending the broadcast connection request in the first timer.

9. A method for communication connection, comprising:
receiving, by a slave device, a broadcast connection request according to a broadcast frequency hopping information and a second timer, wherein the broadcast connection request is a request sent from a host device according to the broadcast frequency hopping information and a first timer, the broadcast connection request carries the communication frequency hopping information, and a timing duration of the first timer is less than the timing duration of the second timer;
setting, by the slave device, the currently used frequency hopping information as the communication frequency hopping information according to the broadcast connection request;
sending, by the slave device, the broadcast acknowledgement response to the host device;
receiving, by the slave device, a connection request, wherein the connection request is a request sent from the host device according to the first timer and the communication frequency hopping information when the host device receives the broadcast acknowledgement response; and
establishing by the slave device, a communication connection with the host device according to the connection request.

10. The method of claim 9, wherein after receiving the broadcast connection request, the method comprises:
setting, by the slave device, the second timer currently used as the first timer according to the broadcast connection request.

11. The method of claim 10, wherein after establishing the communication connection with the host device, the method comprises:
interacting, by the slave device, with the host device using the communication frequency hopping information and the first timer.

12. The method of claim 9, wherein after establishing the communication connection with the host device, the method comprises:
monitoring, by the slave device, the broadcast connection request sent from the host device by the second timer and the broadcast frequency hopping information, if the connection request sent from the host device not being received within a preset duration.

13. The method of claim 9, wherein a third frequency point used by the slave device to receive the broadcast connection request is different from a fourth frequency point, the fourth frequency point is a frequency point used by the slave device and the host device to interact with each other.

14. The method of claim 9, wherein the slave device using the second timer and the broadcast frequency hopping information to monitor the broadcast connection request sent from the host device, when the slave device does not receive the connection request sent from the host device within a preset duration.

15. A communication system, comprising a host device and a slave device;
the host device being configured to send a broadcast connection request to the slave salve device according to a first timer and a broadcast frequency hopping information of the host device, the host device being further configured to send a connection request to the slave device according to the first timer and a communication frequency hopping information after receiving a broadcast acknowledgement response sent from the slave device;
the slave device being configured to receive the broadcast connection request according to the broadcast frequency hopping information and a second timer, and send the broadcast acknowledgement response to the host device, the slave device being further configured to receive the connection request sent from the host device, and establish a communication connection with the host device according to the connection request.

16. The communication system of claim 15, wherein the broadcast connection request is configured to instruct a target slave device to set the second timer currently used as the first timer.

17. The communication system of claim 15, wherein after the host device establishing a communication connection with at least one slave device transmitting a broadcast acknowledgement response, the host device is further configured to:
use the communication frequency hopping information and the first timer to interact with the connected slave device.

18. The communication system of claim 15, wherein the first frequency point used by the host device to send the broadcast connection request is different from the second frequency point, the second frequency point is a frequency point used by the host device and the slave device to interact with each other.

19. The communication system of claim 15, wherein after the slave device receives the broadcast connection request according to the broadcast hopping information and the second timer, the slave device is further configured to:
set the second timer currently used as the first timer according to the broadcast connection request.

20. The communication system of claim 15, wherein after the slave device establishes a communication connection with the host device according to the connection request, the slave device is further configured to:
use the communication frequency hopping information and the first timer to interact with the host device.

* * * * *